United States Patent [19]

Draggoo

[11] 4,296,388
[45] Oct. 20, 1981

[54] THERMALLY IMPROVED DYE LASER FLOW CHANNEL

[75] Inventor: Vaughn G. Draggoo, Richland, Wash.

[73] Assignee: Jersey Nuclear-Avco Isotopes, Inc., Bellevue, Wash.

[21] Appl. No.: 88,775

[22] Filed: Oct. 29, 1979

[51] Int. Cl.³ .............................................. H01S 3/08
[52] U.S. Cl. .......................... 331/94.5 L; 331/94.5 C; 331/94.5 D
[58] Field of Search ..................... 331/94.5 L, 94.5 D; 330/4.3

[56] References Cited

U.S. PATENT DOCUMENTS 4,178,565  12/1979  Morton ......................... 331/94.5 L

*Primary Examiner*—William L. Sikes
*Assistant Examiner*—Leon Scott, Jr.
*Attorney, Agent, or Firm*—Weingarten, Schurgin & Gagnebin

[57] ABSTRACT

A fluid laser having a flow channel between fluid inlet and active lasing regions and in which medium heating and resulting medium disturbances are reduced by minimizing channel wall and window heating in the area of the channel bordering the window seal. The channel wall includes a bevelled portion exterior of the channel and having a highly reflective surface immediately adjacent a window. The resulting thinning of the channel wall immediately adjacent the window reduces the absorption in the window seal region of reflected flashlamp light and of dye fluorescence light originating from within the flow channel, and the highly reflective surface reflects away from the window seal region the dye fluorescent light and reflected lamp light. Polished edge surfaces on the window also refract away from the window seal region the dye fluorescent light and reflected light passing through the window/air interface. A cooled absorbing surface in a confronting spaced relationship with the highly reflective surface acts to absorb and conduct away from the channel wall the reflected and refracted lamplight and dye fluorescent light. A baffle shields this surface from flashlamp light. The reduction in channel wall heating produces a more homogeneous medium which contributes to better laser beam quality.

16 Claims, 3 Drawing Figures

THERMALLY IMPROVED DYE LASER FLOW CHANNEL

FIELD OF THE INVENTION

The present invention relates generally to laser flow channels and in particular to the prevention of heating of flow channel walls, including the window portion thereof, and the prevention of the resulting laser medium inhomogeneity.

BACKGROUND OF THE INVENTION

The liquid dye laser is currently used as a source of laser excitation or amplification in applications of laser enrichment, such as shown, for example, in U.S. Pat. No. 3,944,947. In such applications, there are at least three principal objectives for the laser oscillator or amplifier, namely high energy in each laser pulse, high repetition rate, and an output beam of laser radiation of high optical quality and low divergence. In these applications output powers of several hundreds of watts at pulse rates of several hundreds of pulses per second in combination with an output beam as close to defraction limited as possible are desired goals. One of the important advances in laser systems in achieving these objectives has been the transverse pump laser as shown in U.S. Pat. No. 3,740,665, wherein the optical axis is transverse to the flow direction of the fluent laser material, typically a laser dye solution. This permits a rapid replenishment of dye into the region of the optical axis to replace expended dye, increasing both power and repetition rate.

To some extent both power and repetition rate can be augmented by increasing the level of applied exitation to the optical axis and by increasing the flow velocity of the fluent laser material. Excessive heating and breakdown of fluid dynamic flow characteristics are limiting factors here as well as turbulence due to heating effects. In addition, the variation in refractive index throughout the fluent laser material produced by temperature variations greatly degrades the beam quality.

One source of such temperature gradients and turbulence is the heating of the window seal region and of the flow channel walls upstream of the lasing region by the absorption of reflected lamplight or stray dye fluorescence light produced within the flow channel by the excited dye solution. Another cause of heating is the absorption by the walls in the window seal region of flashlamp light reflected from the interface formed between the window and the liquid dye solution. A third cause of heating of the flow channel walls is the absorption of light emanating directly from the flashlamp. For flow channels in which the flow upstream of the lasing region is not strictly laminar, temperature and the associated refractiveindex gradients generated as the liquid moves past the channel wall may appear in the lasing region during subsequent pulses. These gradients severely degrade laser beam quality, further reduce laser output energy, which in turn increases the amount of fluorescence available to cause further channel wall heating.

Heating of the flow channel walls upstream by the absorption of stray fluorescence light may be considerably reduced in the manner shown in U.S. Pat. Application Ser. No. 852,224, assigned to the assignee of this invention, and now U.S. Pat. No. 4,178,565.

SUMMARY OF THE INVENTION

The present invention includes a liquid dye laser having a lasing area in which fluid flowing through the laser may be excited to produce laser radiation. Laminar flow of the lasing fluid upstream of the lasing area is enhanced by reducing heating of the window seal region resulting from the absorption therein of direct and reflected flashlamp light and by the absorption of flashlamp light and dye fluorescence light originating from within the flow channel. Light directed towards the window seal region of the channel wall is reflected away from the channel wall by means of highly refracted bevelled surfaces formed on the channel walls adjacent the windows. It is further refracted away from the channel wall by means of polished surfaces formed on the window edges at the window/air interface. Such refracted and reflected light is absorbed by a cooled absorbing surface formed on a fin in a confronting spaced relationship with the reflective bevelled surface. The dye medium is further thermally isolated upstream from the lasing area by providing a flow of cooling fluid through the channel walls. Other flashlamp light is absorbed by the outer surface of the fin.

DESCRIPTION OF THE DRAWING

These and other features of the present invention are more fully set forth below in the exemplary and nonlimiting detailed description of the preferred embodiment and in the accompanying figures, in which.

DETAILED DESCRIPTION OF THE INVENTION

In liquid, organic dye lasers, transverse pumping of the dye is required for high pulse repetition rate operation. Such pumping assures that for each subsequent pulse, fresh unexcited laser medium is available. Optical gradients in the laser dye produced by the conversion into thermal energy of a part of the excitation energy are thereby swept out of the lasing region prior to the next pulse. However, the lasing of the liquid dye will produce significant amounts of fluorescent energy which are not coupled out of the system as laser light. This energy can impinge upon the window seal and other regions of the fluid channel upstream of the lasing areas and thereby heat the channel walls. In addition, light produced by the flashlamp, or other energy source, may be reflected at the window/liquid interface or by the liquid itself toward the window seal region and other portions of the upstream channel structure and thereby also heat the channel walls. Finally, some light from the flashlamp may strike the exterior of the channel walls directly to produce further upstream wall heating.

Figure 1:
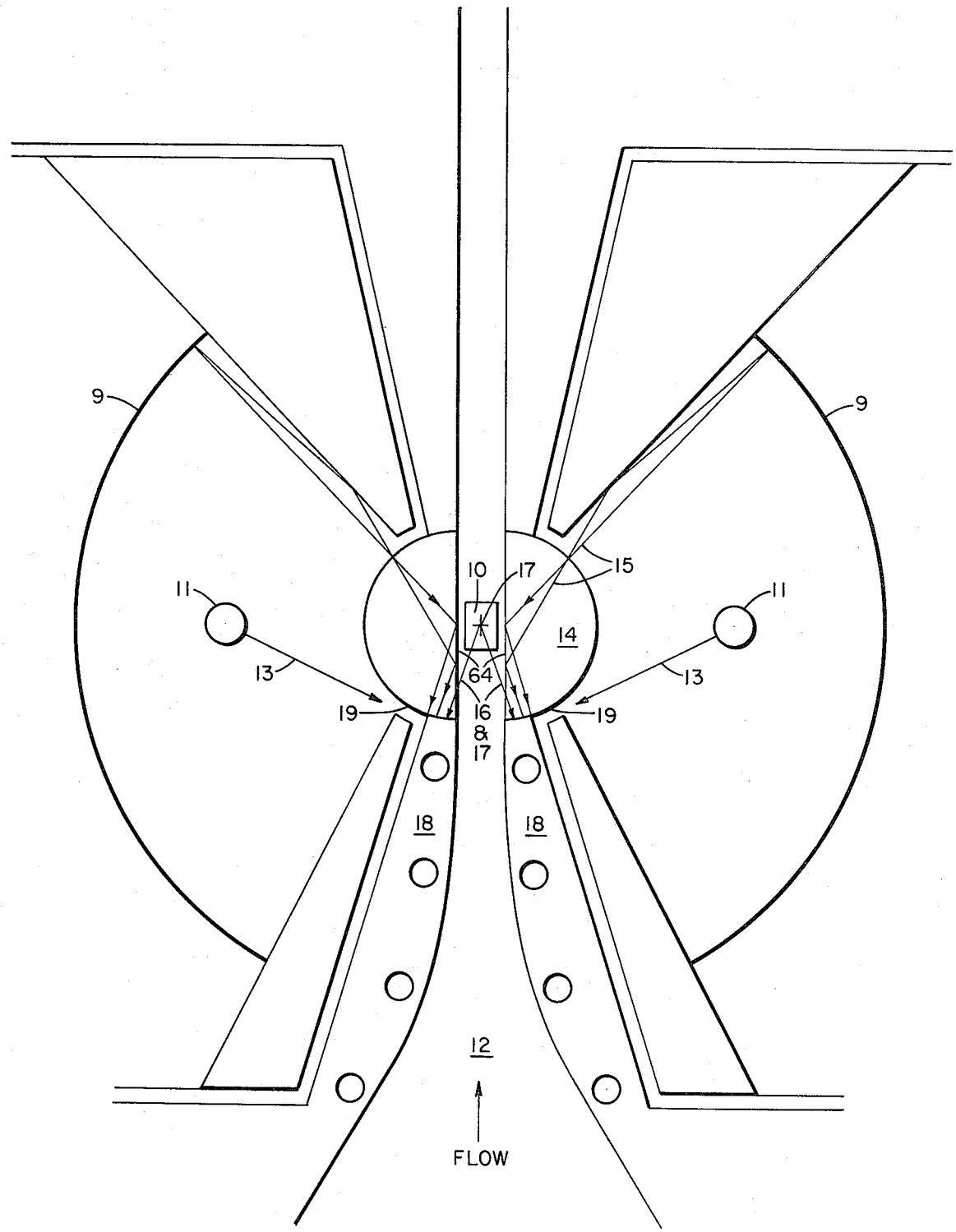
FIG. 1 shows a sectional view of a transverse flow laser dye channel illustrating the manner in which heating in the window seal region occurs in prior art lasers due to absorption of flashlamp light and fluorescent radiation.

These effects may be more readily explained by referring to FIG. 1 which shows a cross-sectional drawing of a prior art transverse pumped dye laser flow channel, similar to that described in U.S. Pat. Application Ser. No. 852,224 and now U.S. Pat. No. 4,178,565. In FIG. 1 a lasing region 10 is located in a flow of a liquid dye lasing material 12. Semi-cylindrical optically transparent windows 14 allow the lasing area to be excited by means of energy introduced by an external source, such as flashlamps 11 and reflectors 9. During the period of lasing action, most of the energy in lasing region 10 is coupled out of the system as coherent laser radiation along an axis transverse to the flow of the dye lasing liquid 12. (This is into and out of the page in the view of FIG. 1) However, a small amount of fluorescent energy is radiated from lasing region 10 in other generally random directions. As shown diagrammatically by arrows 16, some of this energy is radiated in a direction upstream of lasing region 10 and impinges upon window seal regions 19. Window seal regions 19 generally comprise an area in which channel walls 18 abut the perimeter of window 14 in sealing engagement therewith. Also, as shown diagrammatically by arrows 15, light energy from flashlamps 11 and from reflectors 9 is reflected at the interface 64 between the liquid dye lasing material 12 and the window 14, and strikes the upstream window seal region 19. Arrows 17 represent sources and paths of undesired, heat generating flashlamp and other light returned from region 10 resulting from scattered excitation. Finally, as shown diagrammatically by arrows 13, light energy from flashlamps 11 impinges directly upon the window seal region 19 or upon channel walls 18 to cause channel walls 18 to increase in temperature. Radiation from each of these sources causes the window seal region 19, channel walls 18 and window 14 to increase in temperature, and this heating results in undesirable heating of the fluid flow upstream of lasing region 10.

It has been calculated that the combination of returned flashlamp light 17 and dye fluorescent light 16 originating from within region 10 and impinging on window seal region 19 accounts for as much as 20% of the total heat load for the upper area of the channel wall 18 near the window seal region 19.

Figures 2, 3:
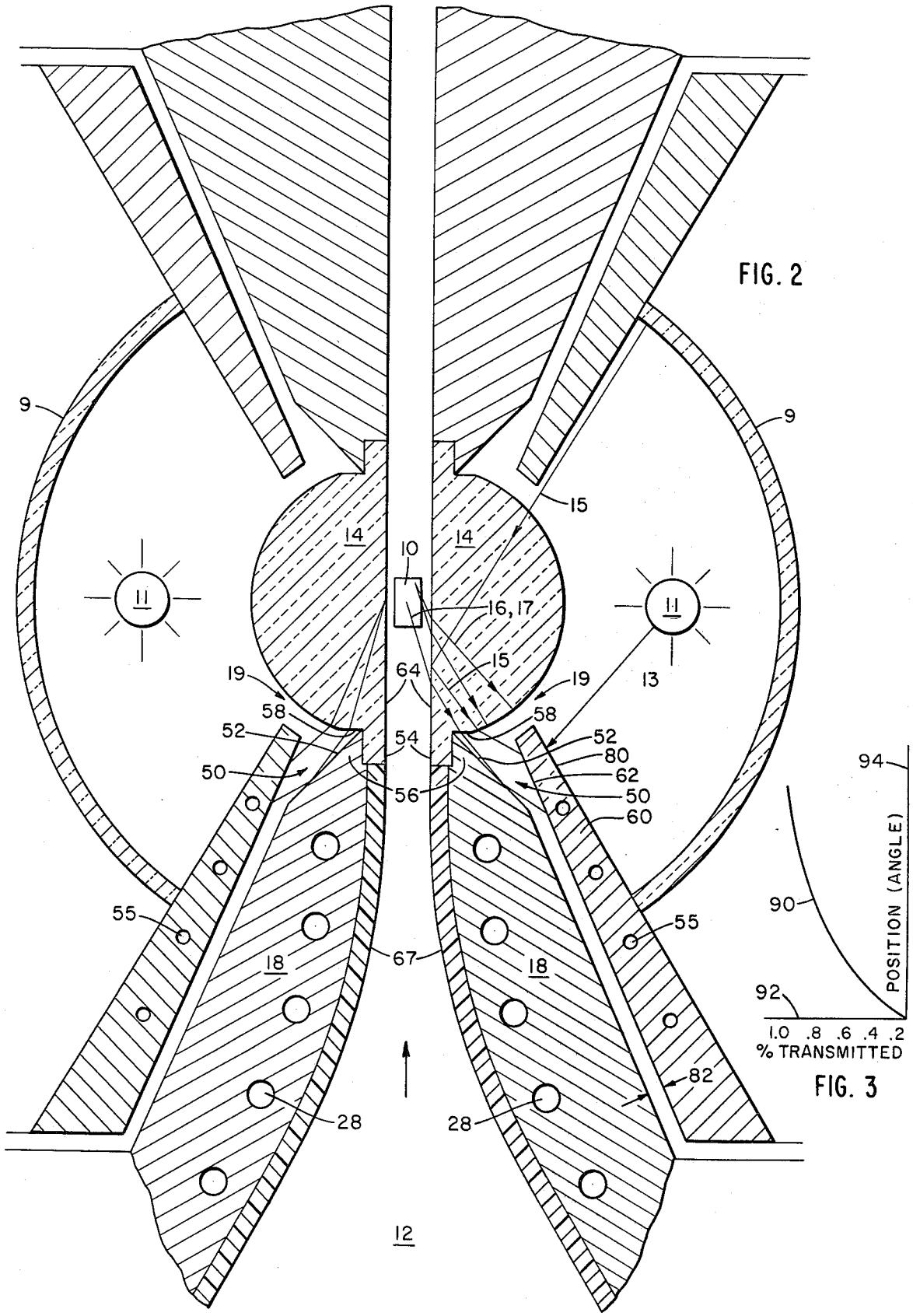
FIG. 2 shows a sectional view of such a laser having a structure according to the present invention by which such heating is avoided.
FIG. 3 is a graph showing the change in transmitted intensity along the window seal region of light rays originating from the center of the flow channel as the angle subtended by the window seal changes.

The problem of upstream heating in the window seal region 19 and walls 18 may be substantially reduced by modifying the channel walls 18 and the windows 14 as shown in FIG. 2, which is one exemplary embodiment of the present invention. Where applicable, the same numbers are used for like parts in FIG. 2 as in FIG. 1. In FIG. 2 a transverse pumped, liquid dye laser, similar to that of FIG. 1 is shown, including a flow of liquid dye lasing material 12 through a lasing region 10 located between transparent windows 14. Upstream, each wall 18 is provided with a bevel 50 in the window seal region 19. Bevel 50 has a highly reflective surface 52 disposed thereon. Bevel 50 terminates in a tongue 56 abutting each window 14, and overlapping a channel bordering lip 54 formed on the perimeter of window 14. Windows 14 have polished edge surfaces 58 adjacent lips 54, and surfaces 58 typically have a flat configuration. Surfaces 58 are preferably roughly perpendicular to walls 18 and may be formed by truncating opposed portions of the semi-cylindrical window 14 shown in FIG. 1. Surfaces 58 of window 14 form an interface between the window and the ambient atmosphere.

A cooled fin 60 is disposed between channel wall 18 and flashlamp 11. An absorbing surface 62 is formed on a portion of cooled fin 60 facing reflecting surface 52. Cooled fin 60 serves as a heat sink, and the efficiency thereof may be increased by pumping a cooling fluid therethrough, as shown by cooling ports 55.

The channel bordering portions 67 of upstream channel walls 18 are preferably formed of a material which is transparent or translucent to the frequencies at which fluorescent radiation 16 is produced by the liquid dye laser, thereby permitting absorption of such fluorescent radiation 16 by channel walls 18, all as described in U.S. Pat. Application Ser. No. 852,224. Within channel walls 18 are located cooling ports 28 for conducting away heat created by this absorption. The junction between channel bordering portions 67 and lip 54 should be as smooth and continuous as possible to avoid producing turbulence, and lip 54 is captured against tongue 56 by fluid pressure in the dye flow.

Stray fluorescent radiation as shown in FIG. 1 by arrows 16 and produced by the excited dye solution in lasing region 10 passes through windows 14 via refraction at surfaces 64 and 58. Radiation 16 then either is reflected from reflecting surface 52 onto absorbing surface 62 or strikes absorbing surface 62 directly. Likewise flashlamp light 17 originating from lamps 11 or reflectors 9 is refracted through both interfaces 64 after which it then passes through surfaces 58 where it is again refracted. This refracted flashlamp light 17 then either is reflected from reflecting surface 52 onto absorbing surface 62 or impinges directly upon absorbing surface 62. Other flashlamp light 15 is reflected from the interface 64 after which it passes through surface 58 where it is refracted. Similarly, this flashlamp light 15 then either is reflected from reflecting surface 52 onto absorbing surface 62, or strikes absorbing surface 62 directly. Other flashlamp light 13 impinges directly upon cooled fin 60 at surface 80. In each instance heat generated by the absorption of radiation is dissipated by cooled fin 60, and if desired, by a cooling fluid flowing through ports 55. Cooled fin 60 is spaced from channel wall 18 by a gap 82 through which the ambient atmosphere is allowed to circulate. Thus channel wall 18 is insulated from cooled fin 60 so as to prevent heating of channel wall 18 and of the lasing material 12.

Referring now to FIG. 3, a graph is displayed showing the percentage of stray fluorescent radiation 16 and flashlamp light 17 striking wall 18 at window seal region 19 (horizontal axis 92) plotted as a function of the angle from region 10 subtended by the window-to-channel wall seal (vertical axis 94). Line 90 of FIG. 3 shows that as the angle subtended increases, the percentage of radiation striking wall 18 likewise increases. Thus, the amount of light impinging upon the window seal region 19 may be reduced by reducing the thickness thereof. In accordance with FIG. 3, channel wall 18 in the vicinity of tongue 56 is preferably as thin as possible. However, it should be noted, that in practice, thinning of the channel wall 18 is limited by the tendency of the pressure exerted by liquid 12 to distort the channel wall contour.

The invention disclosed herein permits a significant reduction in the heating of the window seal region 19 while still providing a channel wall structure having sufficient strength to prevent distortion of the channel wall contour shown in FIG. 1. This necessary channel wall strength is maintained by the use of a thick lower channel wall structure as shown in FIG. 2. The reduction in heat absorbed by the window seal region 19 of channel wall 18 by the configuration shown in FIG. 2 typically amounts to 80%.

The angle formed by reflecting surface 52 of bevel 50 with respect to the inner surface of channel wall 18 is preferably of a size such that an optimum amount of light transmitted through surface 58 is reflected onto absorbing surface 62. However, the size of the angle is restricted to a certain extent by the structural requirement of the channel wall, as previously noted. Taking into account the above considerations, the angle formed by reflecting surface 52 is typically 35° with respect to the inner surface of channel wall 18, the wall thickness in the window seal region 19 is typically 0.25 inches (0.64 cm), and the thickness of channel wall 18 is typically 0.50 inches (1.27 cm) at its widest point.

The concept disclosed herein and shown by the configuration in FIG. 2 is not necessarily limited to flashlamp excited lasers. A laser pumped-laser would presumably have a smaller component of pump light heating because of the high directionality of the pump light, but the fluorescent component would remain unchanged if the average output power remains unchanged, and thus the configuration shown in FIG. 2 could be utilized advantageously therein.

The described system for increasing the power available from a transverse pumped fluid dye laser may be achieved in structures other than the specific structure described above. Accordingly, the invention is to be limited only as indicated in the following claims.

What is claimed is:

1. In a fluid laser comprising:
   a channel having a flow therethrough of a laseable fluid;
   a conduit for a flow of said fluid upstream of said channel;
   an optically transparent window in optical communication with said laseable fluid and having a first interface therewith, said window having a second interface with an ambient atmosphere disposed externally of said channel;
   means disposed externally of said channel and in optical communication with said window for exciting said laseable fluid in said channel by the transmission of light thereto through said window to cause laser radiation including fluorescent radiation to be produced in a region of said channel; and
   at least one wall member partially defining said upstream conduit for the flow of said fluid upstream of said channel, portions of said wall member being adjacent a perimeter of said window and being in sealing engagement therewith;
   means for reducing heat absorbed by said wall member comprising:
   a bevelled surface formed on said wall member externally of said conduit on said portions adjacent said perimeter of said window to provide a reduction in transverse thickness in said wall member portions adjacent said perimeter;
   a highly reflective surface formed on said bevelled surface and facing away from said channel, said reflective surface being adapted to reflect away from said wall member said light and said fluorescent radiation directed theretoward and emanating from within said channel and said light directed theretoward and reflected from said first interface;
   means in a confronting spaced relationship with said reflective surface for receiving and absorbing light energy reflected from said reflective surface.

2. The fluid laser of claim 1 wherein said reducing means further comprises at least one polished edge surface formed on said second interface of said window and adapted to refract away from said wall member said light and said fluorescent radiation emanating from within said channel and said light reflected from said first interface and directed toward said wall member.

3. The fluid laser of claim 2 wherein said window further comprises a lip formed on the perimeter thereof, said lip being sealed against overlapping portions of said bevelled surface by fluid pressure within said channel.

4. The fluid laser of claim 2 wherein said window is semi-cylindrical in shape and wherein said edge surface is a flat formed on a truncated side portion thereof perpendicular to said first interface.

5. The fluid laser of claim 4 wherein said window and accordingly said lasing region extend transverse to said flow direction.

6. The fluid laser of claim 1 wherein said wall member includes means for conducting cooling fluid therethrough.

7. The fluid laser of claim 2 wherein said receiving and absorbing means includes means for conducting cooling fluid therethrough.

8. The fluid laser of claim 1 wherein said reflective surface comprises a polished portion of said bevelled surface.

9. A fluid laser comprising:
   a channel having a flow therethrough of a laseable fluid;
   a conduit for a flow of said fluid upstream of said channel;
   a semi-cylindrical optically transparent window in optical communication with said laseable fluid and defining a portion of said channel;
   means disposed externally of said channel and in optical communication with said window for exciting said laseable fluid in said channel by the transmission of light thereto through said window and to cause laser radiation including a fluorescent radiation to be produced in a region of said channel;
   at least one cooled wall member disposed adjacent to said window, said wall member at least partially defining said upstream conduit;
   means for thermally insulating said wall member from said flow in said conduit, said insulating means being transmissive to said fluorescent radiation so that said fluorescent radiation passes through said insulating means to said cooled wall member, thereby avoiding heating of said flow in said conduit;
   sealing means for sealingly engaging a perimeter of said window to adjoining portions of said wall member and for sealingly engaging adjoining portions of said insulating means to a perimeter of said window to cooperatively form a junction between said channel and said conduit;
   a bevelled surface formed on an edge of said wall member externally of said conduit and adjacent said perimeter of said window to provide reduction in transverse thickness in portions of said member adjoining said perimeter of said window;
   means disposed on said bevelled surface and facing away from said channel for reflecting away from said wall member fluorescent light and lamp light directed theretoward and emanating from within said channel and from within said window;
   at least one polished surface formed on an interface between exterior surfaces of said window and an atmosphere disposed externally of said conduit, said polished surface being adapted to refract away from said wall member fluorescent light and lamp light directed theretoward and emanating from within said window and from within said channel; and means in a confronting spaced relationship with said reflective means for receiving and absorbing light energy reflected from said reflective means and refracted by said polished surface.

10. In a fluid laser having:

a channel having a flow therethrough of a laseable fluid;

a conduit for a flow of said fluid upstream of said channel;

an optically transparent window in optical communication with said laseable fluid and having a first interface therewith, said window having a second interface with an atmosphere disposed externally of said channel;

means disposed externally of said channel and in optical communication with said window for exciting said laseable fluid in said channel by the transmission of light thereto through said window and to cause laser radiation including fluorescent radiation to be produced in a region of said channel; and at least one wall member, partially defining said upstream conduit for the flow of said fluid upstream of said channel, portions of said wall member being adjacent a perimeter of said window and being in sealing engagement therewith;

a method for reducing heat absorbed by said wall member comprising the steps of:

reflecting from a highly reflective bevelled surface formed on said portions of said wall member adjacent said perimeter, fluorescent radiation and lamp light emanating from within said channel and lamp light reflected from said first interface and directed towards said wall member; and absorbing light reflected in said reflecting step on a cooled absorbing surface disposed in a spaced and confronting relationship with said wall member.

11. The method of claim 10 further comprising the steps of;

refracting away from said wall member at said second interface fluorescent radiation and lamplight emanating from within said channel and lamplight reflected from said first interface and directed toward said wall member by means of at least one polished flat surface formed on said second interface; and absorbing on said cooled absorbing surface light refracted in said refracting step.

12. The method of claim 11 wherein said window is semi-cylindrical in shape and said flat surface is formed on a truncated side portion thereof.

13. The method of claim 10 wherein said window and accordingly lasing region extends transverse to the flow.

14. The method of claim 10 further comprising the step of conducting a cooling fluid through said wall member.

15. The method of claim 10 further comprising step of conducting cooling fluid in thermal communication with said absorbing surface.

16. A fluid laser comprising:

a channel having a flow therethrough of a laseable fluid;

a conduit having a flow of said fluid upstream of said channel;

an optically transparent window in optical communication with said laseable fluid and having a first interface therewith, said window having a second interface with an ambient atmosphere disposed externally of said channel;

means disposed externally of said channel and in optical communication with said window for exciting said laseable fluid in said channel by the transmission of light thereto through said window to cause laser radiation including fluorescent radiation to be produced in a region of said channel;

at least one wall member partially defining said conduit having the flow of said fluid upstream of said channel, portions of said wall member being adjacent a perimeter of said window and being in sealing engagement therewith;

means for reducing heat absorbed by said wall member, said reducing means comprising a surface formed on said wall member externally of said conduit and on said portions of said wall member adjacent said perimeter of said window to provide a reduction in transverse thickness in the portions of said wall member adjacent the window perimeter.

* * * * *